(12) United States Patent
Rivera et al.

(10) Patent No.: US 10,702,096 B2
(45) Date of Patent: Jul. 7, 2020

(54) BREWING CHAMBER CLEANER

(71) Applicant: Adrian Rivera, Whittier, CA (US)

(72) Inventors: Adrian Rivera, Whittier, CA (US);
Kenneth L. Green, La Habra Heights, CA (US)

(*) Notice: Subject to any disclaimer, the term of this patent is extended or adjusted under 35 U.S.C. 154(b) by 0 days.

(21) Appl. No.: 15/191,259

(22) Filed: Jun. 23, 2016

(65) Prior Publication Data
US 2017/0119203 A1 May 4, 2017

Related U.S. Application Data

(60) Provisional application No. 62/249,009, filed on Oct. 30, 2015.

(51) Int. Cl.
| | |
|---|---|
| *A47J 31/60* | (2006.01) |
| *B08B 9/093* | (2006.01) |
| *B05B 1/14* | (2006.01) |
| *B08B 9/00* | (2006.01) |
| *B05B 3/02* | (2006.01) |
| *B05B 3/06* | (2006.01) |
| *B05B 3/00* | (2006.01) |
| *B05B 13/04* | (2006.01) |

(Continued)

(52) U.S. Cl.
CPC .......... *A47J 31/60* (2013.01); *B05B 1/14* (2013.01); *B05B 1/20* (2013.01); *B05B 3/001* (2013.01); *B05B 3/02* (2013.01); *B05B 3/06* (2013.01); *B05B 13/0421* (2013.01); *B08B 9/00* (2013.01); *B08B 9/0936* (2013.01); *B08B 9/0813* (2013.01)

(58) Field of Classification Search
CPC .... A47J 31/60; A47J 31/0689; A47J 31/4475; A47J 31/4478; B08B 9/00; B08B 9/02; B08B 9/08; B08B 9/0804; B08B 9/0813
See application file for complete search history.

(56) References Cited

U.S. PATENT DOCUMENTS

| | | | |
|---|---|---|---|
| 5,230,278 A | 7/1993 | Bunn et al. | |
| 5,325,765 A | 7/1994 | Sylvan et al. | |
| 5,398,596 A | 3/1995 | Fond | |

(Continued)

FOREIGN PATENT DOCUMENTS

| | | |
|---|---|---|
| CN | 103054469 A | 4/2013 |
| WO | 2006032601 A1 | 3/2006 |

(Continued)

*Primary Examiner* — David G Cormier
(74) *Attorney, Agent, or Firm* — IP Strategies (57) ABSTRACT

A brewing chamber cleaner including a spinning or stationary assembly for spraying cleaning solution into the brewing chamber. The spinning assembly may be attached to a disk configured to removably reside in the brewing chamber, or be part of a coffee maker. Liquid pumped into the brewing chamber cleaner may cause the spinning assembly to spin by the liquid flowing past gears or a propeller, or by off center jets on the spinning member. Alternatively, the coffee maker includes a rotating shaft to cause the spinning assembly to spin or may include stator winding creating a rotating magnetic field to cause the spinning assembly to spin. In another embodiment the brewing chamber cleaner includes a wide spray provided by a fixed nozzle. A base is optionally provided to capture the spray and direct a flow into a bottom extraction needle of the coffee maker to clean the extraction needle.

36 Claims, 12 Drawing Sheets

(51) Int. Cl.
    *B05B 1/20*     (2006.01)
    *B08B 9/08*     (2006.01)

(56) References Cited

U.S. PATENT DOCUMENTS

| | | |
|---|---|---|
| 7,059,239 B2 | 6/2006 | Balkau |
| 7,509,908 B1 | 3/2009 | Lassota et al. |
| 2007/0157821 A1* | 7/2007 | Panesar ............... A47J 31/0673 99/279 |
| 2007/0175334 A1 | 8/2007 | Halliday et al. |
| 2007/0175335 A1* | 8/2007 | Liverani ............. A47J 31/3695 99/279 |
| 2008/0223218 A1 | 9/2008 | Magg et al. |
| 2009/0229470 A1* | 9/2009 | Dorfmueller ....... A47J 31/0689 99/295 |
| 2010/0229729 A1* | 9/2010 | Garcia .................... A47J 31/60 99/281 |
| 2011/0076361 A1* | 3/2011 | Peterson ............. A47J 31/0673 426/79 |
| 2012/0207895 A1* | 8/2012 | Rivera ................ A47J 31/0689 426/433 |
| 2013/0017303 A1* | 1/2013 | Vu ...................... A47J 31/0689 426/433 |
| 2015/0090300 A1* | 4/2015 | Dyer .................. H01L 21/0271 134/22.18 |

FOREIGN PATENT DOCUMENTS

| | | | |
|---|---|---|---|
| WO | 2012037409 A1 | 3/2012 | |
| WO | 2015123612 A1 | 8/2015 | |

\* cited by examiner

BREWING CHAMBER CLEANER

CROSS-REFERENCE TO RELATED APPLICATIONS

The present application claims the priority of U.S. Provisional Patent Application Ser. No. 62/249,009 filed Oct. 30, 2015, which application is incorporated in its entirety herein by reference.

BACKGROUND OF THE INVENTION

The present invention relates to beverage brewing and in particular to a liquid spray into a brewing chamber for cleaning the brewing chamber.

Brewed beverages are often prepared by injecting water into a brewing chamber containing a brewing material such as ground coffee beans. Various configurations are known including inserting a needle into the brewing material, streams of water injected down into the brewing material. Unfortunately, water released or sprayed into the brewing material may form channels or pockets, and the brewed beverage is not uniformly extracted from the brewing material.

BRIEF SUMMARY OF THE INVENTION

The present invention addresses the above and other needs by providing a brewing chamber cleaner including a spinning or stationary assembly for uniformly spraying water into the brewing material. The spinning assembly may be attached to a disk configured to removably reside in the brewing chamber, or be part of a coffee maker. The water is sprayed in a moving pattern to clean the brewing chamber. On one embodiment, water is pumped into the removable cleaner, and the flow of water causes the spinning assembly to spin by the water flowing past gears or a propeller, or by off center jets on the spinning member. In another embodiment, the coffee maker includes a rotating shaft engaging the cleaner to cause the spinning assembly to spin, or may include stator winding creating a rotating magnetic field in the brewing chamber to cause the spinning assembly to spin. In another embodiment a wide spray is provided by a fixed nozzle. A base is optionally provided to capture the spray and direct a flow into a bottom extraction needle of the coffee maker.

In accordance with one aspect of the invention, there is provided a brewing chamber cleaner including a rotating disbursing member. The disbursing member may be rotated by a tangential water spray, by a rotating shaft of the coffee maker, or by a rotating magnetic field.

In accordance with another aspect of the invention, there is provided a brewing chamber cleaner including a fixed disbursing member. The disbursing member includes orifices to spray cleaning liquid against brewing chamber walls, and an attachable extraction needle cleaner to capture the cleaning liquid and clean the extraction needle.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A large variety of coffee and espresso makers are commonly used to make beverages. The coffee and espresso makers are often used one or more times every day, and residue builds as a result of the use.

Figures 1A, 1B, 1C:
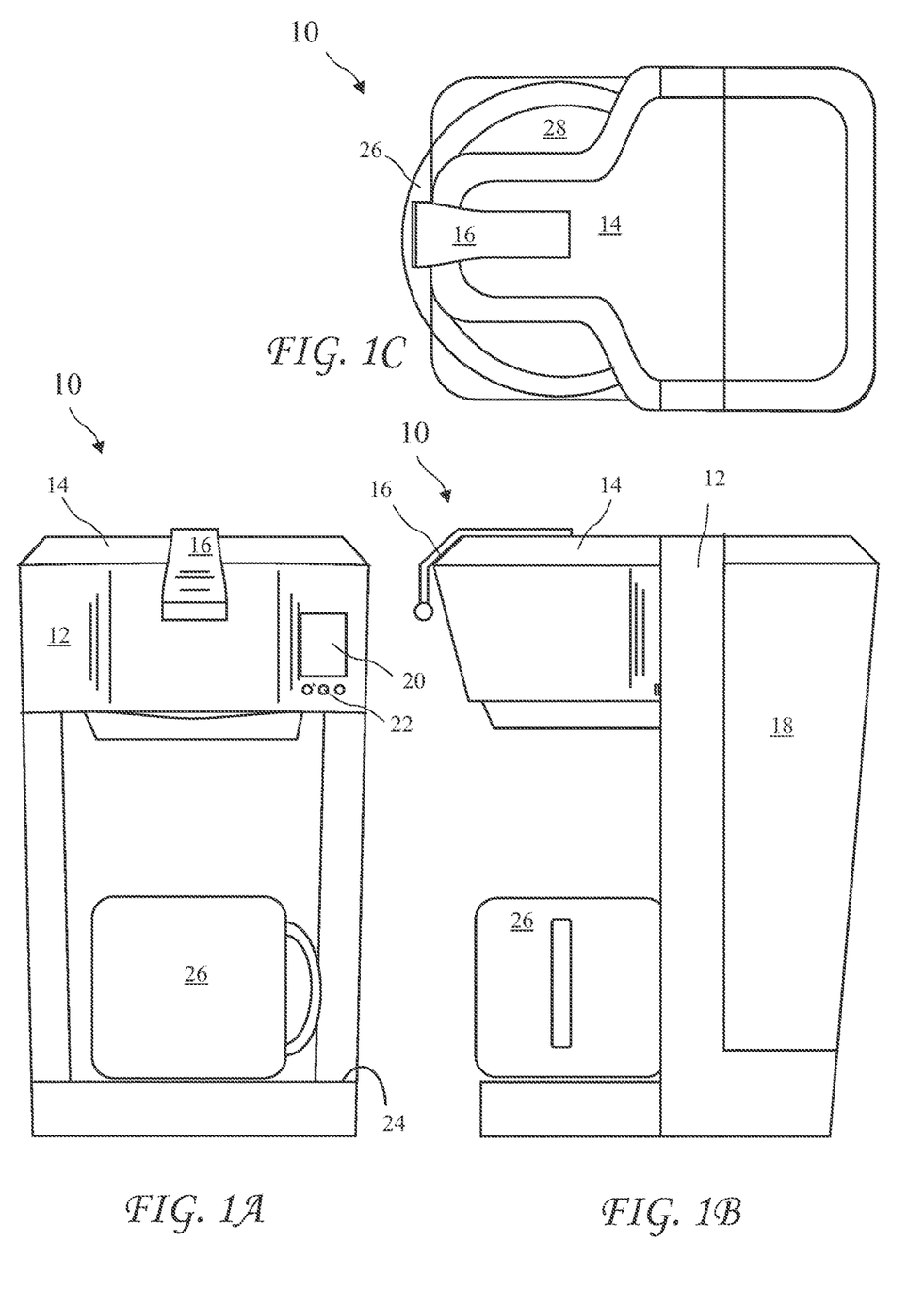
FIG. 1A is a front view of a coffee maker according to the present invention.
FIG. 1B is a side view of the coffee maker according to the present invention.
FIG. 1C is a top view of the coffee maker according to the present invention.

A front view of a coffee maker 10 according to the present invention is shown in FIG. 1A a side view of the coffee maker 10 is shown in FIG. 1B, and a top view of the coffee maker 10 is shown in FIG. 1C. The coffee maker 10 includes a base 12, a brewing chamber lid 14, a lid handle 16, a water container 18, a display 20, controls 22, and platform 24. A cup 26 rests on the platform 24. The coffee maker 10 provides a flow of hot water through brewing material to produce a brewed drink. The flow of water may be heated by one of any known means, for example, an electrical heating coil, inductive heating, or a conductive coating on tubing carrying the water.

Figure 2:
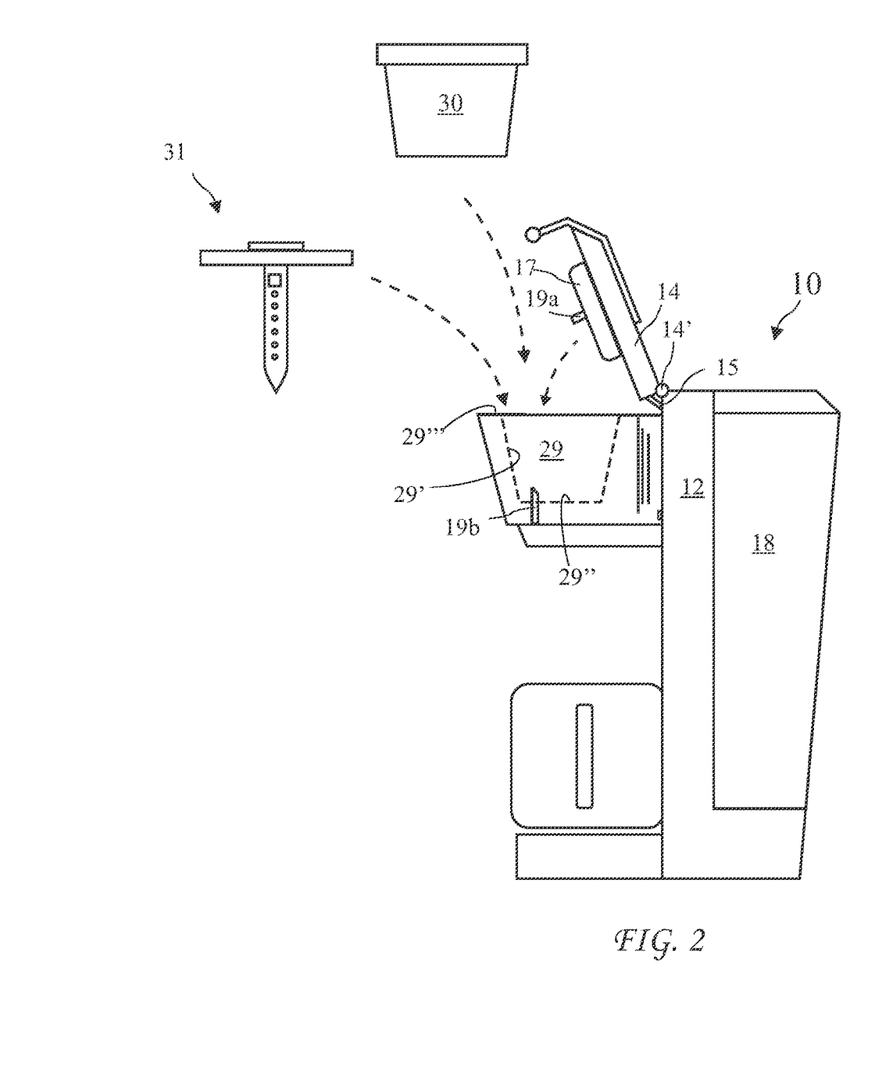
FIG. 2 is a side view of the coffee maker with an open lid allowing placement of a brewing material holder according to the present invention inside the coffee maker.

A side view of the coffee maker 10 with a brewing chamber lid 14 allowing placement of a brewing material holder 30, or a brewing chamber cleaner 31, according to the present invention inside brewing chamber (or brewing cartridge holder) walls 29' supported by supported by cartridge retaining features comprising a rim 77 resting on a top edge 29" of the brewing chamber (or brewing cartridge holder) 29 and above a brewing chamber (or brewing cartridge holder) base 29''' of a brewing chamber (or brewing cartridge holder) 29 of the coffee maker 10 is shown in FIG. 2. The brewing chamber lid 14 includes a lid hinge 14' and a water tube 15 carries heated water into the lid 14. A pad 17 resides on a bottom surface of the brewing chamber lid 14 and presses against the brewing chamber cleaner 31 when the brewing chamber lid 14 is closed, and in cooperation with several embodiments discloses hereafter, sprays liquid into the brewing chamber to clean the brewing chamber. An injection nozzle 19a extending down from the brewing chamber lid 14 directs the flow of liquid into the brewing chamber cleaner 31 and an extraction nozzle 19b extends up into the brewing chamber 29 to release and carry liquid from the brewing chamber 29 in some embodiments.

Figure 2A:
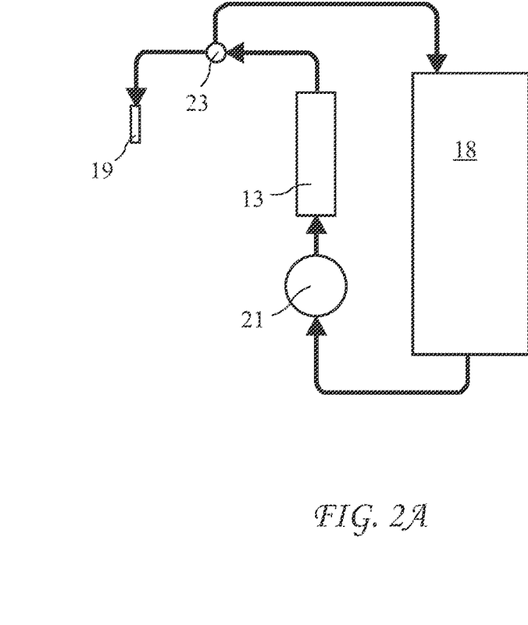
FIG. 2A is a functional diagram of the coffee maker.

A functional diagram of the coffee maker 10 is shown in FIG. 2A. The preferred coffee (or brewing material) maker 10 includes the water tank 18, water pump 21, a heater 13, check valve 23 and the nozzle 18. The pump 21 preferably provides at least one PSI water pressure. The water heater 13 may include a heating coil, inductive heating, or a resistive coating or any other means for heating water. The check valve 23 limits the water pressure at the nozzle 19a by returning some of the water flow to the water tank 18. While the water pump 21 is a preferred method for providing a flow of water to the nozzle 19a, other methods include placing the water in the water tank 18 under pressure, and a coffee maker using any means to provide a forced flow of water is intending to come within the scope of the present invention.

Figure 3A:
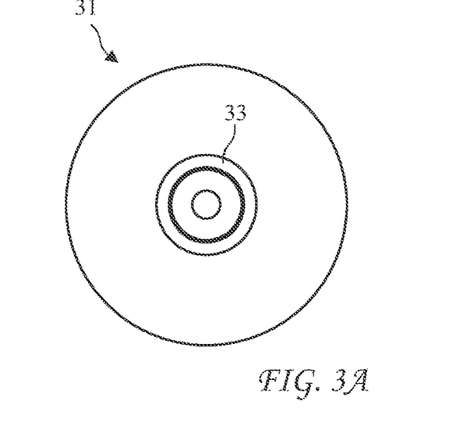
FIG. 3A is a top view of a dynamic brewing chamber cleaner according to the present invention.
Figure 3B:
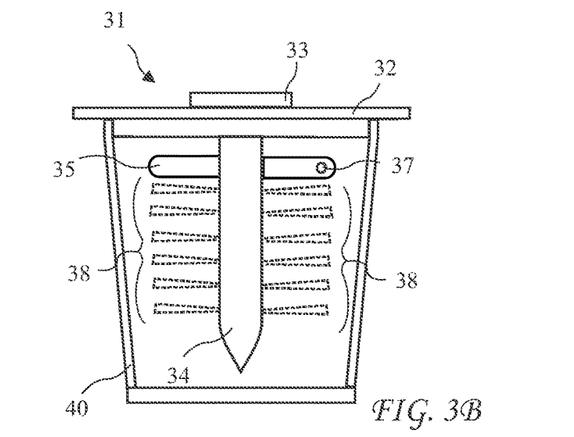
FIG. 3B is a side view of the dynamic brewing chamber cleaner according to the present invention.
Figure 3C:
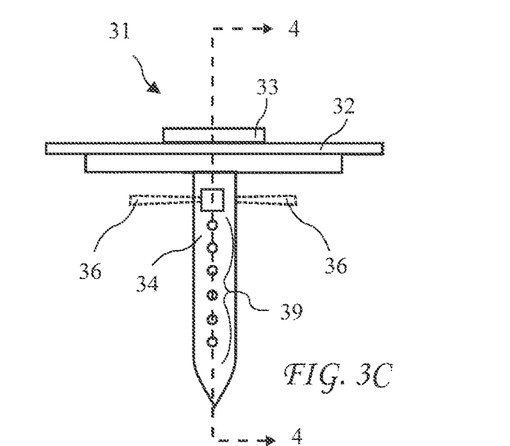
FIG. 3C is a second side view of the dynamic brewing chamber cleaner according to the present invention rotated 90 degrees.

A top view of a dynamic brewing chamber cleaner 31 according to the present invention is shown in FIG. 3A, a first side view of the dynamic brewing chamber cleaner 31 is shown in FIG. 3B and a second side view of the dynamic brewing chamber cleaner 31 rotated 90 degrees is shown in FIG. 3B. The dynamic brewing chamber cleaner 31 includes a lid 32 and a column 34. The lid 32 serves as an adapter to position the brewing chamber cleaner with respect to the brewing chamber 29. A seal 33 extends up from the lid 32 to seal to the coffee maker 10 (see FIG. 2) to provide a flow of water 42 under pressure to the dynamic brewing chamber cleaner 31. The lid 32 may be configured to be held in the coffee maker in the same manner that a coffee holder lid is held in the coffee maker.

The brewing chamber cleaner 31 may be configured to allow use in coffee makers sold under the trademark KEURIG which include a top puncture needle for injecting pressurized water into a brewing cartridge, and a bottom puncture needle for puncturing sealed brewing cartridges to extract brewed beverage. Such coffee makers are described in U.S. Pat. No. 5,325,765, incorporated herein by reference in its entirety. A pressurized flow of water 42 enters the brewing chamber cleaner 31 through a passage 47 in the lid 32. The passage 47 may be configured to accept the top puncture needle of the '765 patent. A skeleton 40 may be attached to the lid 32. The skeleton 40 provides a perimeter configured to cooperate with the coffee maker of the '765 patent, seating in the coffee maker to provide support for the brewing chamber cleaner 31 while avoiding the bottom puncture needle of the '765 patent.

Figure 4:
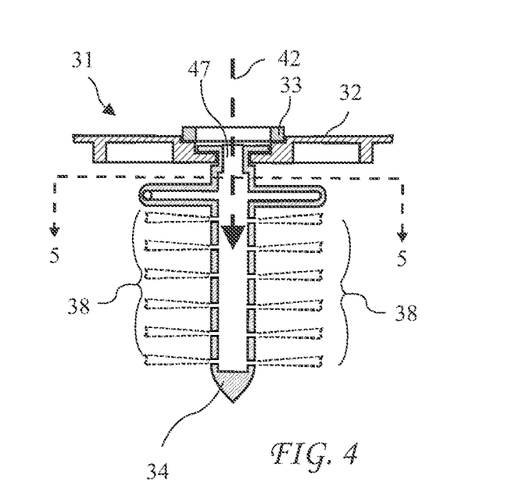
FIG. 4 is a cross-sectional view of the dynamic brewing chamber cleaner according to the present invention taken along line 4-4 of FIG. 3C.
Figure 5:
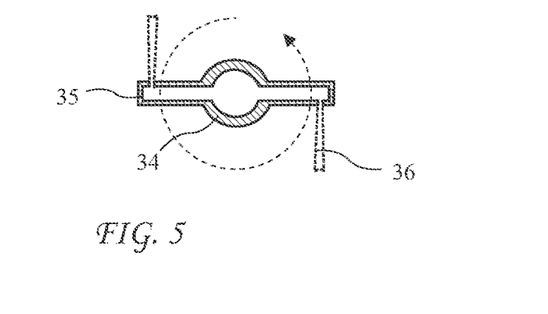
FIG. 5 is a cross-sectional view of the dynamic brewing chamber cleaner according to the present invention taken along line 5-5 of FIG. 4.

A cross-sectional view of the dynamic brewing chamber cleaner 31 along line 4-4 of FIG. 3A is shown in FIG. 4 and a cross-sectional view of the dynamic brewing chamber cleaner 31 taken along line 5-5 of FIG. 4 is shown in FIG. 5. A column (or dispensing member) 34 having an interior 34a is rotatable attached to the lid 32. The hollow column 34 includes ports (or orifices) 39 releasing radial sprays 38 of liquid (for example, water or cleaning solution) into the brewing chamber 29. The column 34 includes arm 35 extending radially and including ports 37 releasing tangential sprays of water 36. The tangential sprays of water 36 urge the column 34 to spin, thus cleaning the brewing chamber 29.

Figure 6A:
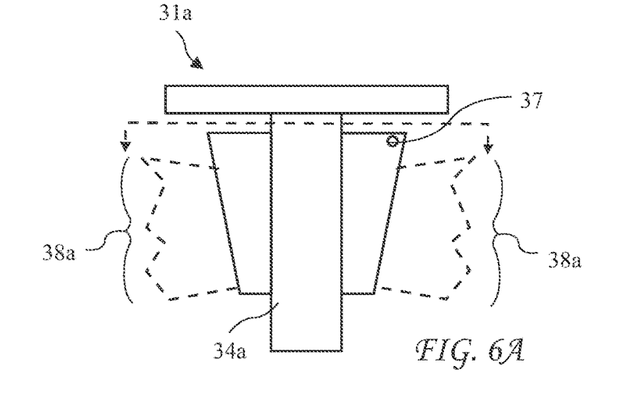
FIG. 6A shows a first side view of a second dynamic brewing chamber cleaner according to the present invention.
Figure 6B:
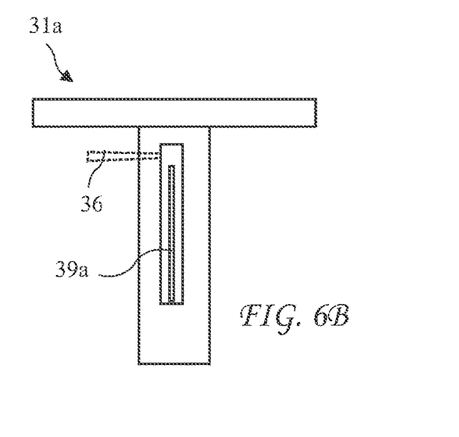
FIG. 6B shows a second side view of the second dynamic brewing chamber cleaner according to the present invention.

A first side view of a second dynamic brewing chamber cleaner 31a is shown in FIG. 6A and a second side view of a second dynamic brewing chamber cleaner 31a showing tangential flows 36 to rotate the column 34a to rotate the column 34a is shown in FIG. 6B. The dynamic brewing chamber cleaner 31 includes slots 39a providing sheets of water 38a for cleaning the brewing chamber, and ports 37 provide tangential flows 36 rotating the column 34a. The dynamic brewing chamber cleaner 31a is otherwise similar to the dynamic brewing chamber cleaner 31.

Figure 7:
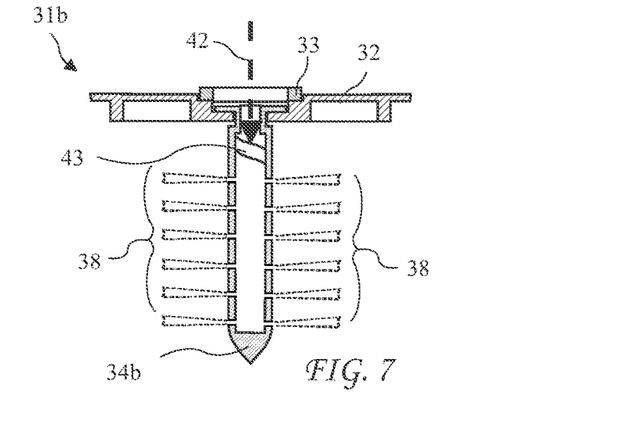
FIG. 7 shows a cross-sectional view of a third dynamic brewing chamber cleaner according to the present invention having internal propeller elements.

A cross-sectional view of a third dynamic brewing chamber cleaner 31b having internal propeller elements 43 is shown in FIG. 7. The water flow 42 through the internal propeller elements 43 causes the column 34a to spin, thus providing dynamic water dispersion into the brewing chamber 29. The second dynamic brewing chamber cleaner 31a is otherwise similar to the dynamic brewing chamber cleaner 31.

Figure 8:
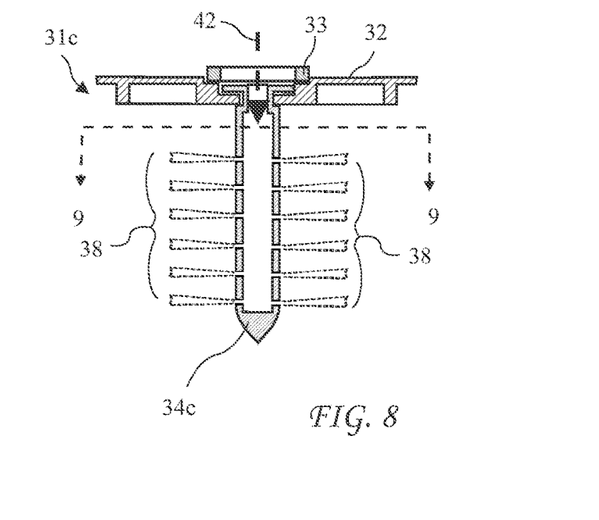
FIG. 8 shows a cross-sectional view of a fourth dynamic brewing chamber cleaner according to the present invention having tangentially directed sprays.
Figure 9:
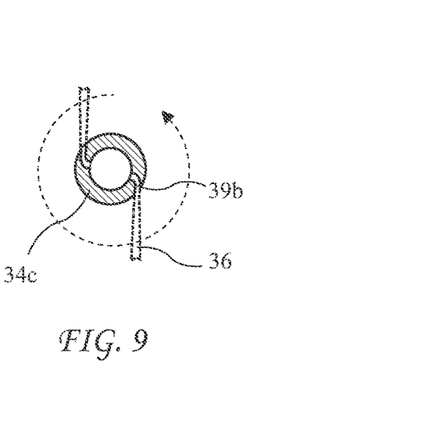
FIG. 9 is a cross-sectional view of the fourth dynamic brewing chamber cleaner according to the present invention taken along line 9-9 of FIG. 8.

A cross-sectional view of a fourth dynamic brewing chamber cleaner 31c and having tangentially directed sprays is shown in FIG. 8 and a cross-sectional view of the third dynamic brewing chamber cleaner 31b taken along line 9-9 of FIG. 8 is shown in FIG. 9. The ports 39b direct the flows 36 tangentially to rotate the column 34b which does not include the arms 35. The third dynamic brewing chamber cleaner 31b is otherwise similar to the brewing chamber cleaner 31.

Figure 10:
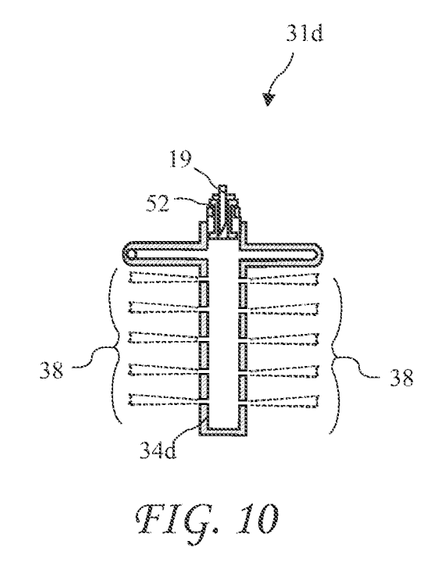
FIG. 10 shows a fifth dynamic brewing chamber cleaner attachable to a coffee maker nozzle, according to the present invention
Figure 11:
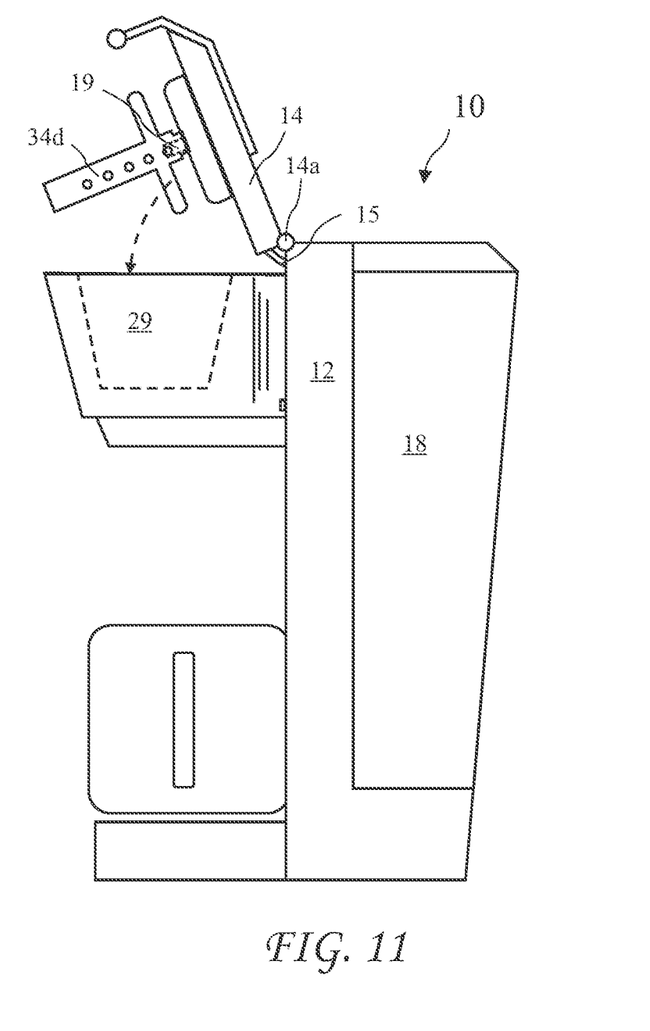
FIG. 11 shows a coffee maker with the fifth dynamic brewing chamber cleaner according to the present invention attached to the nozzle.

A fifth dynamic brewing chamber cleaner 31d attachable to a coffee maker nozzle 19a is shown in FIG. 10 and the coffee maker 10 with the brewing chamber cleaner 31e is shown attached to the nozzle 19a in FIG. 11. The brewing chamber cleaner 31e is similar to the brewing chamber cleaner 31, but includes a bearing or bushing 52 rotatably connecting the column 34d to the nozzle 19a.

Figure 12:
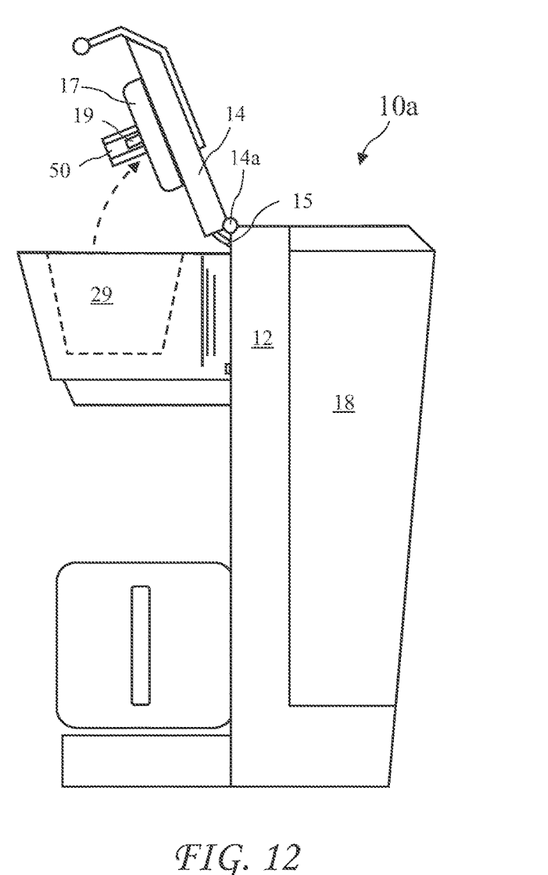
FIG. 12 shows a coffee maker including a rotating shaft engaging a brewing chamber cleaner according to the present invention.
Figure 13:
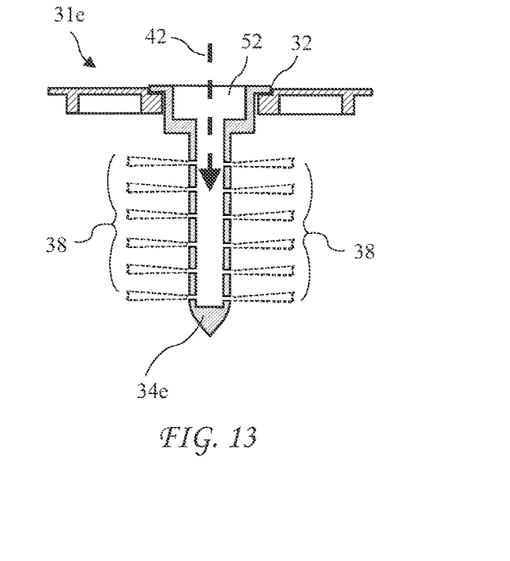
FIG. 13 shows a cross-sectional view of a sixth dynamic brewing chamber cleaner according to the present invention having a center column rotated by the coffee maker.

A coffee maker 10a including a rotating shaft 50 engaging a sixth dynamic brewing chamber cleaner 31e is shown in FIG. 12 and a cross-sectional view of the chamber cleaner 31e having a center column 34d rotated by the rotating shaft 50 is shown in FIG. 13. The rotating shaft 50 engages socket 52 to spin the column 34e.

Figure 14:
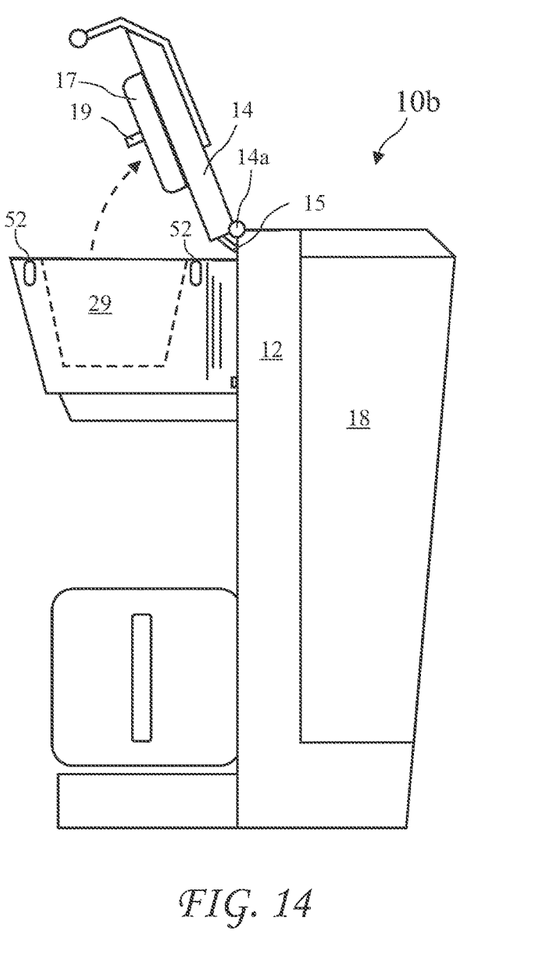
FIG. 14 shows a coffee maker including stator windings creating a rotating stator field in a brewing chamber cleaner according to the present invention.
Figure 15A:
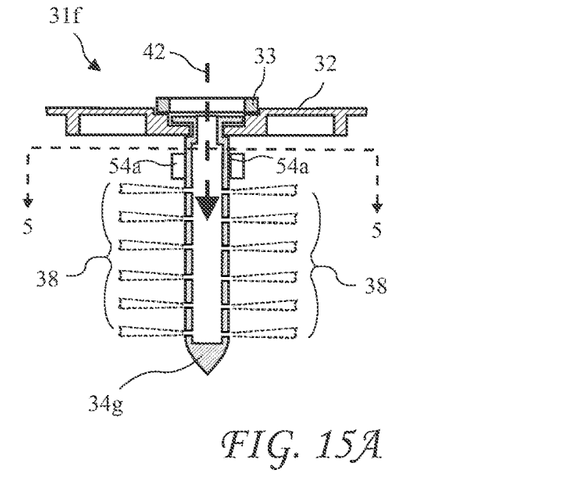
FIG. 15A shows a cross-sectional view of a seventh dynamic brewing chamber cleaner according to the present invention having magnets rotated by the rotating stator field created by the coffee maker.
Figure 15B:
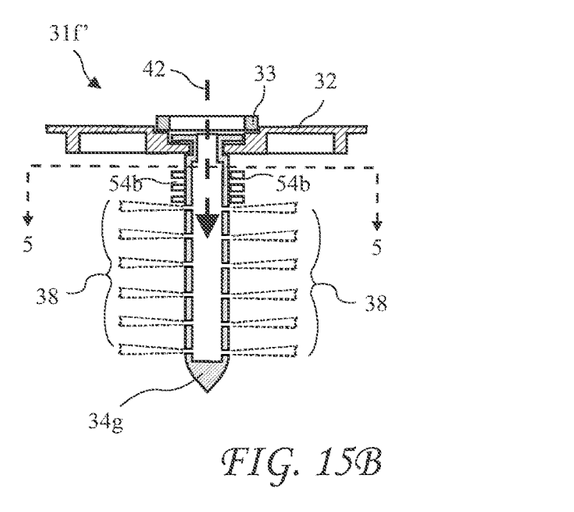
FIG. 15B shows a cross-sectional view of an alternative seventh dynamic brewing chamber cleaner according to the present invention having a squirrel cave rotor rotated by the rotating stator field created by the coffee maker.

A coffee maker 10b including stator windings 52 creating a rotating stator field in a seventh chamber cleaner 31f is shown in FIG. 14 and a cross-sectional view of the chamber cleaner 31f including dynamic water dispersion including magnets 54a rotated by the rotating stator field created by the coffee maker 10b is shown in FIG. 15A and a squirrel cage 54b rotated by the rotating stator field created by the coffee maker 10b is shown FIG. 15B.

Figure 16:
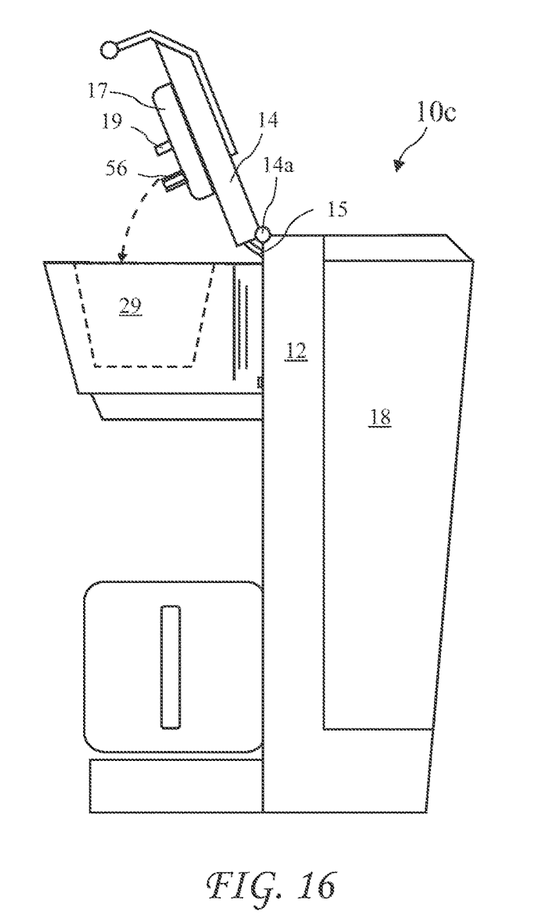
FIG. 16 shows a coffee maker including an offset rotating shaft engaging a brewing chamber cleaner according to the present invention.
Figure 17:
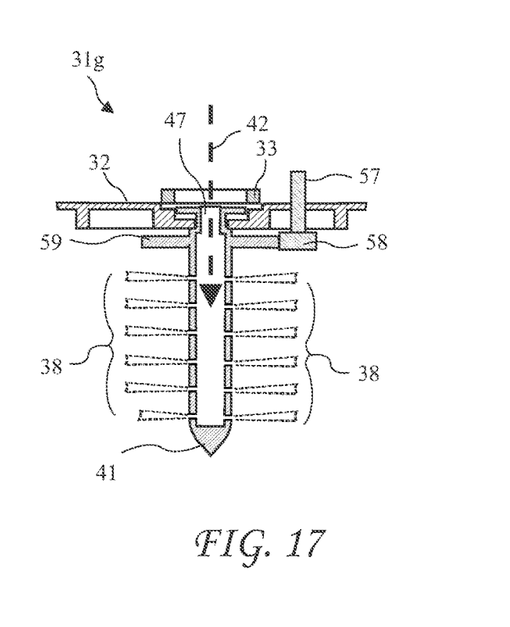
FIG. 17 shows a cross-sectional view of an eighth dynamic brewing chamber cleaner according to the present invention having offset gears and a center column rotated by the coffee maker.

A coffee maker 10c including an offset rotating shaft 56 engaging an eighth chamber cleaner 31g including dynamic water dispersion is shown in FIG. 16 and a cross-sectional view of the chamber cleaner 31g having an offset shaft 57 engaging the offset shaft 56, and gears 58 and 59 rotating the center column is shown in FIG. 17. The offset shafts avoid the nozzle 19a and passage 47. The gears 58 and 59 may be replaced by rollers, or by a belt and hubs.

Figure 18:
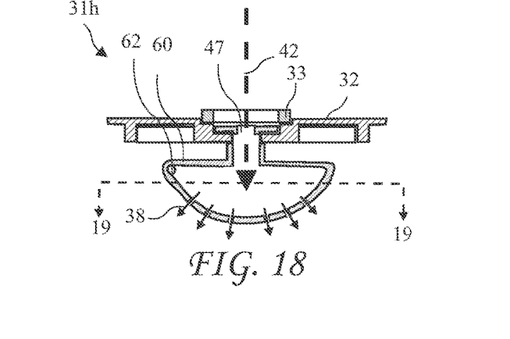
FIG. 18 shows a cross-sectional view of a ninth dynamic brewing chamber cleaner including dynamic water dispersion according to the present invention having a dome according to the present invention for dispersing water.
Figure 19:
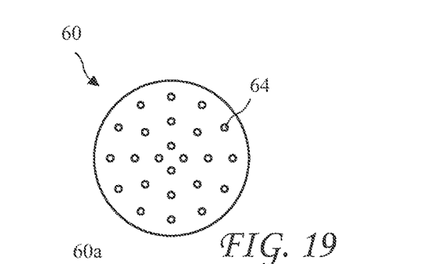
FIG. 19 is a cross-sectional view of the dome according to the present invention taken along line 19-19 of FIG. 18.

A cross-sectional view of a ninth dynamic brewing chamber cleaner 31h including a dome 60 for dispersing water is shown in FIG. 18 and a cross-sectional view of the dome 60 taken along line 19a-19a of FIG. 18 is shown in FIG. 19a. The dome 60 may be rotated by offset tangential sprays from ports 62 similar to sprays 36 (see FIG. 5), or the dome 60 may be rotated by any of the means shown for brewing chamber cleaner 31a-30g. The dome 60 includes at least one dispersion port 64, and preferably a multiplicity of dispersion ports 64.

Figures 20, 22:
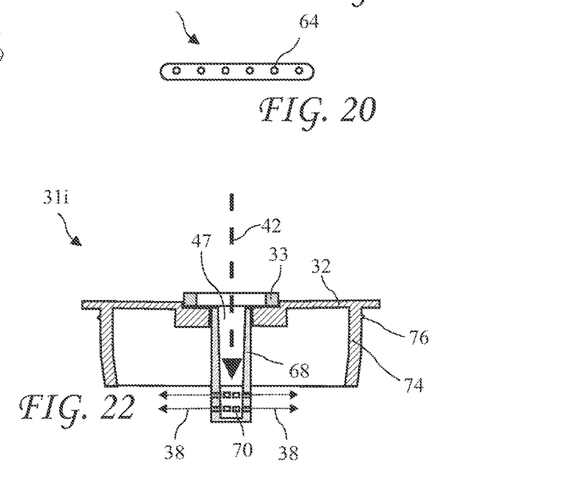
FIG. 20 is a cross-sectional view of a one dimensional dome according to the present invention taken along line 19-19 of FIG. 18.
FIG. 22 is a cross-sectional view of the fixed brewing chamber cleaner according to the present invention, taken along line 22-22 of FIG. 21.

An alternative one dimensional dome 60a is shown in FIG. 20 having a single row of dispersion ports 64.

Figure 21:
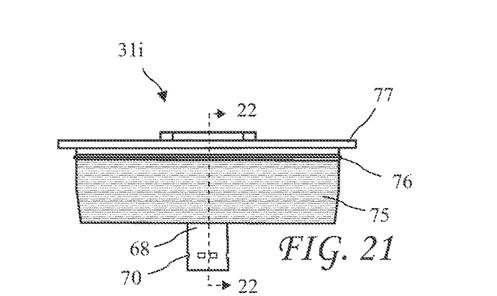
FIG. 21 is a side view of a fixed brewing chamber cleaner according to the present invention.

A side view of a fixed stationary chamber cleaner 31i is shown in FIG. 21 and cross-sectional view of the fixed stationary chamber cleaner 31i is shown in FIG. 22. The brewing chamber cleaner 31i includes a cylindrical extension 68 reaching down into the brewing chamber. The cylindrical extension 68 includes at least one set of orifices 70 opening into the brewing chamber to release sprays 38 of cleaning solution. The orifices 70 may be radially aimed to provide a horizontal spray, or aimed partially up, or be aimed partially down providing a conical spray, preferably not exceeding 45 degrees down. The orifices 70 preferably have a cross-section between 0.5 mm$^2$ and 12 mm$^2$, and more preferably have a cross-section between 1.6 mm$^2$ and 10 mm$^2$, and most preferably have a cross-section of about 6 mm$^2$, to balance sufficient flow and intensity of the spray 38. The orifices may be a single set at the same depth, or two or more sets spaced apart vertically at different depths.

The brewing chamber cleaner 31i further includes a skirt 74 for guiding into the brewing chamber 29 (see FIG. 2). The skirt 74 may be tapered to simplify centering on the brewing chamber 29, may include an annular ring 76 for retaining an extraction needle cleaner 80 (see FIGS. 23A, 23B, and 24), and may include annular scoring 75 providing an interference fit to the extraction needle cleaner 80. A rim 77 reaches radially past the skirt 74 to support the brewing chamber cleaner 31i above the brewing chamber 29.

Figure 23A:
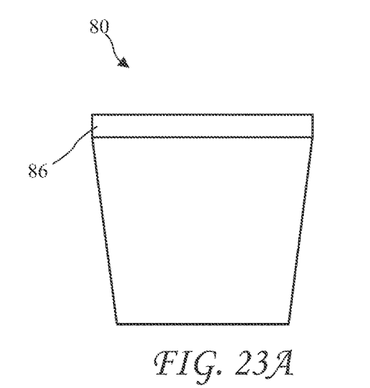
FIG. 23A is a side view of an extraction needle cleaning accessory according to the present invention.
Figure 23B:
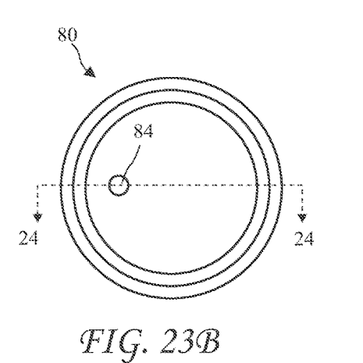
FIG. 23B is a top view of the extraction needle cleaning accessory according to the present invention.
Figure 24:
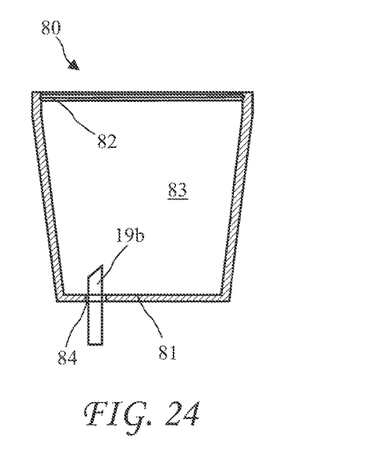
FIG. 24 is a cross-sectional view of the extraction needle cleaning accessory according to the present invention, taken along line 24-24 of FIG. 23B.

A side view of the extraction needle cleaner 80 is shown in FIG. 23A, a top view of the extraction needle cleaner 80 is shown in FIG. 23B, and a cross-sectional view of the extraction needle cleaner 80, taken along line 24-24 of FIG. 23B, is shown in FIG. 24. The extraction needle cleaner 80 is preferably a frusto conical shaped cup deep enough to capture a portion of the extraction needle 19b in an interior 83, and more preferably fits in the envelope of single serving brewing material cartridges sold under the name K_CUPO. Such single serving brewing material cartridges are disclosed in U.S. Pat. No. 7,165,488, incorporated herein by reference.

The extraction needle cleaner 80 includes a top portion 86 configured to engage the skirt 74 of the brewing chamber cleaner 31*i* (see FIG. 21). The top portion 86 may include an annular recess 82 for positive engagement with the annular ring 76 of the lid 31*i*, and may have a surface selected to cooperate with the annular scoring 75 on the skirt 74 to retain the attachment of the extraction needle cleaner 80 to the brewing chamber cleaner 31*i*.

The extraction needle cleaner 80 may be a sturdy plastic cup including a pre-formed passage 84 aligned with the extraction needle 19*b* (see FIG. 2), and the base 81 of the extraction needle cleaner 80 may be a rubber for other flexible material to slide over the extraction needle 19*b* providing a seal. The extraction needle cleaner 80 may also be a thin plastic piece with no pre-formed passage 84, and the extraction needle 19*b* may pierce the plastic when the pre-formed passage 84 is inserted into the brewing chamber 19, for example, when the brewing chamber lid 14 is closed on the brewing chamber cleaner 31*i* with the brewing chamber 19 attached to the brewing chamber cleaner 31*i*.

When the coffee maker 10 is operated with cleaning liquid in the water tank 18 (see FIG. 2) and the brewing chamber cleaner 31*i* in the brewing chamber 19 without the extraction needle cleaner 80 attached, the cleaning liquid is sprayed out of the cylindrical extension 68 against the interior of the brewing chamber 19, thus cleaning the brewing chamber 29. When the coffee maker 10 is operated with cleaning liquid in the water tank 18 (see FIG. 2) and the brewing chamber cleaner 31*i* in the brewing chamber 29 with the extraction needle cleaner 80 attached, the cleaning liquid is sprayed out of the cylindrical extension 68 filling the extraction needle cleaner 80 and washing the extraction needle 19*b*. The cleaning may be done in either order, and may be three steps, the first and third without the extraction needle cleaner 80 attached, and the second with the extraction needle cleaner 80 attached. A final step is preferably performed using water only to rinse the brewing chamber 29 and extraction needle 19*b*.

Figure 25:
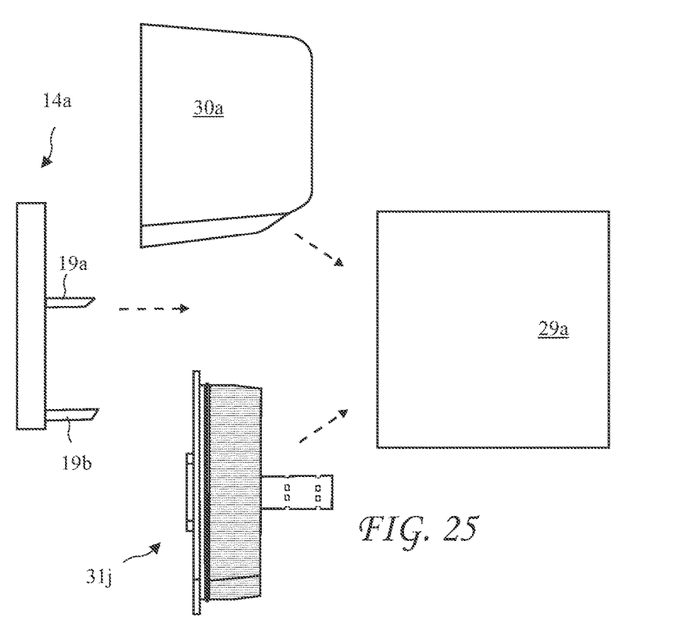
FIG. 25 shows a second brewing chamber configuration and a brewing chamber cleaner according to the present invention for the second brewing chamber configuration.

A second brewing chamber 29*a*, a brewing material cartridge 30*a* for the brewing chamber 29*a*, and a brewing chamber cleaner 31*j* for the second brewing chamber 29*a*, are shown in FIG. 25. The brewing material cartridge 30*a* resides on its side in the brewing chamber 29*a* and the injection needle 19*a* and extraction needle 29*b* are attached to a second brewing chamber lid 14*a*. The brewing chamber cleaner 31*j* includes the passage 47 for the injection needle 19*a*, and a second passage 47*a* for the extraction needle 19*b*.

Figure 26:
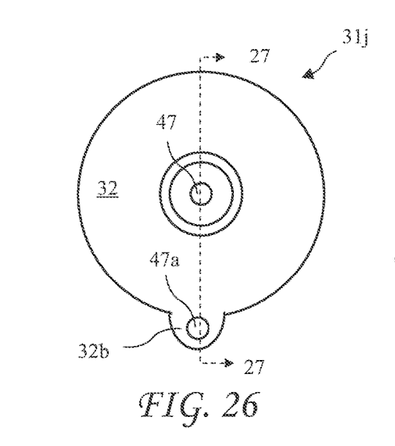
FIG. 26 shows an end view of the brewing chamber cleaner according to the present invention for the second brewing chamber configuration.
Figure 27:
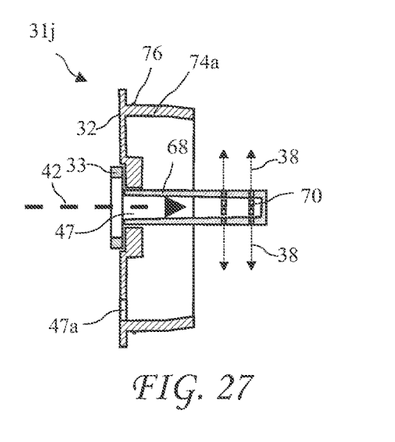
FIG. 27 shows a cross-sectional view of the brewing chamber cleaner according to the present invention for the second brewing chamber configuration, taken along line 27-27 of FIG. 26.

An end view of the brewing chamber cleaner 31*j* is shown in FIG. 26 and a cross-sectional view of the brewing chamber cleaner 31*j*, taken along line 27-27 of FIG. 26, is shown in FIG. 27. A lid 32*a* of the brewing chamber cleaner 31*j* includes an extended portion 32*b* including the passage 47*a* for the extraction needle 19*b*, and a skirt 74*a* providing clearance for the extraction needle 19*b*. The brewing chamber cleaner 31*j* is otherwise similar to the brewing chamber cleaner 31*i*.

Figure 28A:
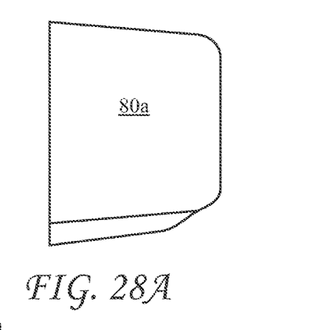
FIG. 28A shows a side view of an extraction needle cleaner according to the present invention for the second brewing chamber configuration.
Figure 28B:
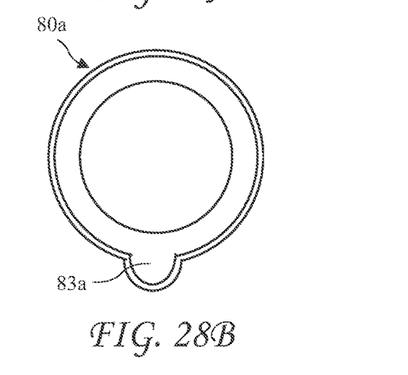
FIG. 28B shows an end view of the extraction needle cleaner according to the present invention for the second brewing chamber configuration.

A side view of an extraction needle cleaner 80*a* for the second brewing chamber configuration is shown in FIG. 28A and a top view of the extraction needle cleaner 80*a* is shown in FIG. 28B. The interior of the extraction needle cleaner 80*a* includes an extraction needle clearance area 83*a* providing space for the extraction needle 19*b*. The extraction needle cleaner 80*a* is otherwise similar to the extraction needle cleaner 80.

Figure 29:
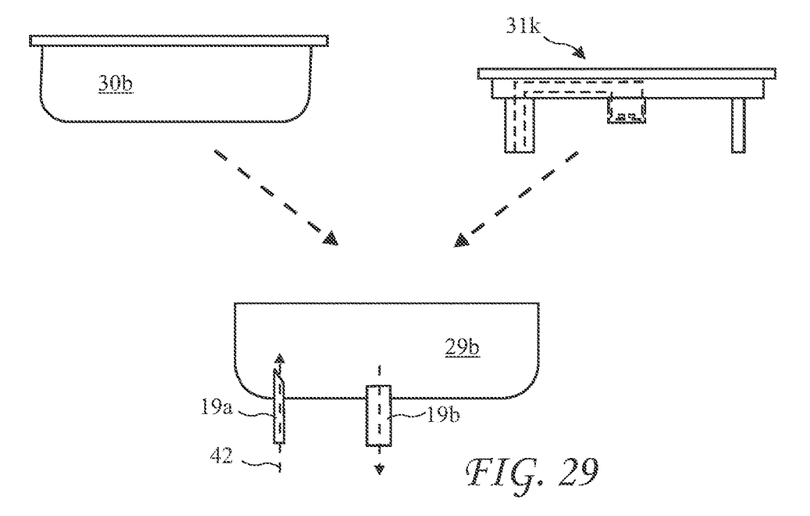
FIG. 29 shows a third brewing chamber configuration and a brewing chamber cleaner according to the present invention for the third brewing chamber configuration.

A third brewing chamber 29*b* configuration and a brewing chamber cleaner 31*k* for the third brewing chamber 29*b* are shown in FIG. 29. The brewing chamber 29*b* is configured to receive a brewing cartridge 30*h*, for example, of the type disclosed in U.S. Pat. No. 8,087,347. The '347 patent is incorporated herein by reference in its entirety.

Figure 30A:
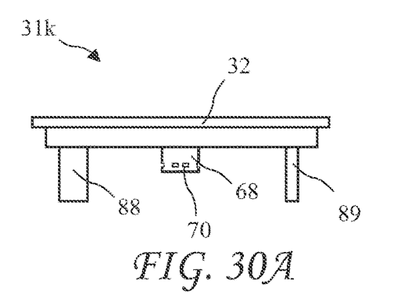
FIG. 30A shows a side view of the brewing chamber cleaner according to the present invention for use in the third brewing chamber.
Figure 30B:
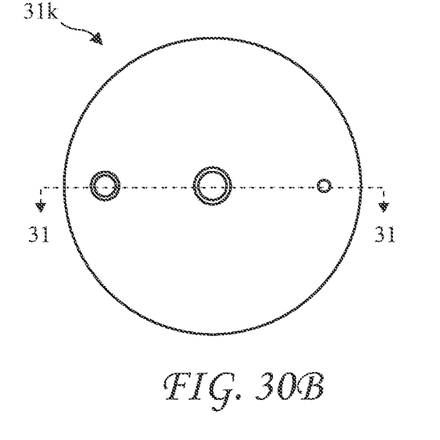
FIG. 30B shows a bottom view of the brewing chamber cleaner according to the present invention for use in the third brewing chamber.
Figure 31:
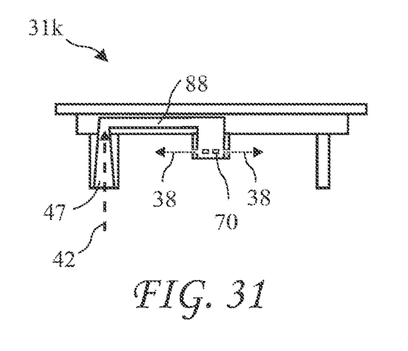
FIG. 31 shows a cross-sectional view of the brewing chamber cleaner according to the present invention for use in the third brewing chamber taken alone line 31-31 of FIG. 30B.

A side view of the brewing chamber cleaner 31*k* is shown in FIG. 30A, a bottom view of the brewing chamber cleaner 31*k* is shown in FIG. 30B, and a cross-sectional view of the brewing chamber cleaner 31*k* taken alone line 31-31 of FIG. 30B is shown in FIG. 31. The brewing chamber cleaner 31*k* includes a lid portion 32, an inlet column 88, and a support member 89 to position the brewing chamber cleaner 31*k* in the brewing chamber 29*b*. A cylindrical extension 68 is generally centered in the brewing chamber 29*b* and includes orifices 70. The inlet column 88 includes a tapers inlet 47. The brewing chamber cleaner 31*k* is otherwise similar to the brewing chamber cleaner 31*i*

Figure 32:
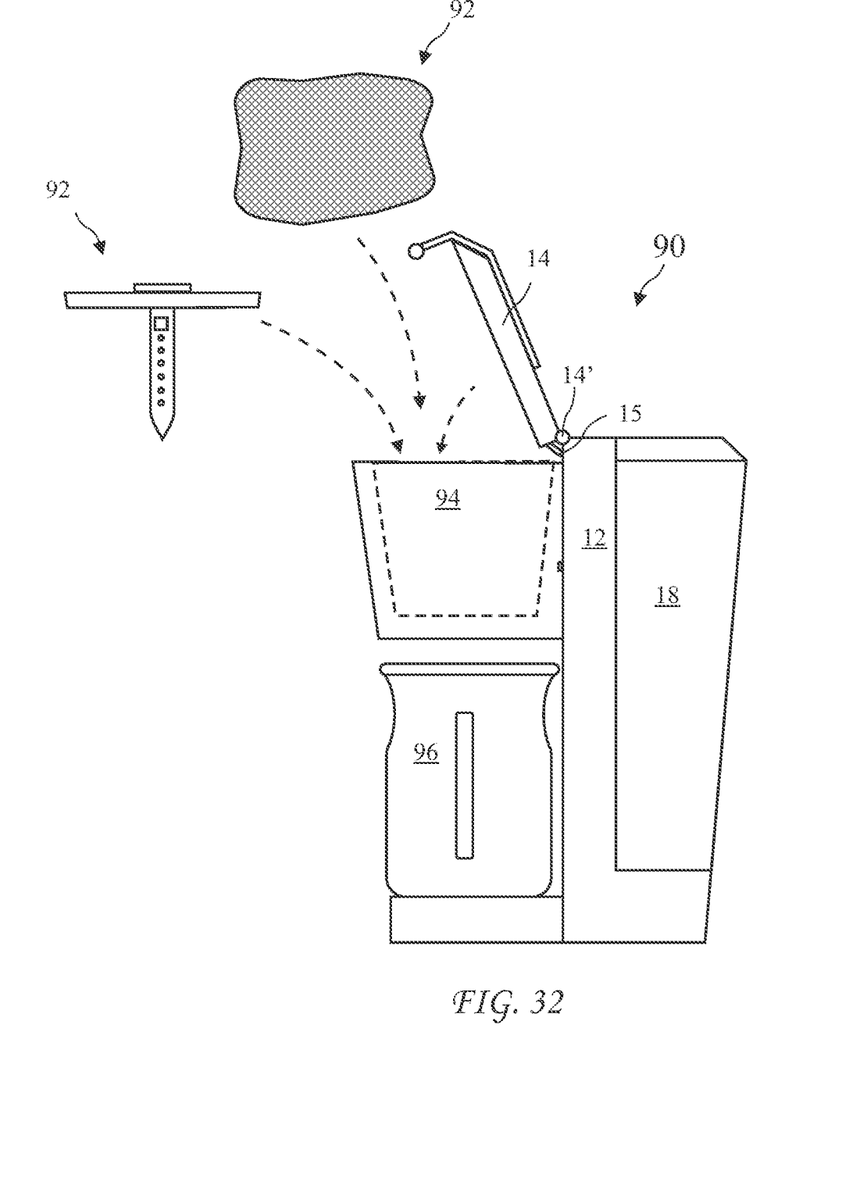
FIG. 32 shows a multi-cup coffee maker and a brewing chamber cleaner according to the present invention for use in the multi-cup coffee maker.

A multi-cup coffee maker 90 and brewing chamber cleaner 92 for use in the multi-cup coffee maker are shown in FIG. 32. The multi-cup coffee maker 90 includes a brewing chamber 94 for receiving a portion of brewing material 92 to make a multi-cup serving of brewed beverage released into a carafe 96. The brewing chamber cleaner 92 preferably rests on a top edge of the brewing chamber 94, but may rest on features of the interior of the brewing chamber 94. Other than size, and positioning features, the brewing chamber cleaner 92 may be similar to any of the brewing chamber cleaners 31-31*i*.

While the invention herein disclosed has been described by means of specific embodiments and applications thereof, numerous modifications and variations could be made thereto by those skilled in the art without departing from the scope of the invention set forth in the claims.

We claim:

1. A beverage brewer spray apparatus, comprising:
   a lid having an obverse surface, a converse surface, and an open peripheral edge;
   a dispersal member fixed to and extending from the converse surface of the lid at an open proximal end of the dispersal member; and
   a skirt having a proximal end fixed to and extending outward from the converse surface of the lid;
   wherein the dispersal member is a tubular element having a sidewall and a closed distal end, wherein the sidewall has a plurality of apertures formed therethrough, wherein the plurality of apertures are arranged in a distal half of the sidewall;
   wherein the lid has a lid through-hole formed between the obverse surface and the converse surface, and the dispersal member is fixed to the converse surface of the lid such that the lid through-hole provides fluid communication from the obverse surface of the lid to the plurality of apertures through an interior of the dispersal member;
   wherein the skirt extends from the converse surface of the lid at a substantially right angle; and
   wherein a proximal portion of the skirt extends from the converse surface of the lid at a substantially right angle and a distal portion of the skirt tapers inward.

2. A beverage brewer and spray apparatus arrangement, comprising;
   a beverage brewer; and
   the beverage brewer spray apparatus of claim 1;

wherein the beverage brewer includes an injection tube, a brewing chamber configured to receive fluid from the injection tube, and an outflow tube configured to receive fluid from the brewing chamber;

wherein the skirt is configured to guide the dispersal member into an open proximal end of the brewing chamber such that the dispersal member is arranged within an interior of the brewing chamber;

wherein the lid through-hole is configured to receive an end of the injection tube such that the dispersal member receives the fluid from the injection tube and disperses the received fluid through the plurality of apertures against a sidewall of the brewing chamber; and wherein the outflow tube is configured to receive the dispersed fluid from the brewing chamber.

3. The beverage brewer and spray apparatus arrangement of claim 2, wherein the converse surface of the lid extends beyond the proximal end of the skirt to form a rim configured to support the lid above the brewing chamber, and the skirt is further configured to center the lid on the brewing chamber.

4. The beverage brewer spray apparatus of claim 1, wherein the skirt at least partially encompasses the dispersal member.

5. The beverage brewer spray apparatus of claim 4, wherein the dispersal member extends from the converse surface of the lid a distance that is farther than a distance that the skirt extends from the converse surface of the lid.

6. The beverage brewer spray apparatus of claim 1, wherein the dispersal member is fixed to the converse surface of the lid at a distance from the peripheral edge of the lid such that a peripheral portion of the lid overhangs an outside surface of the skirt, forming a ledge around the skirt.

7. The beverage brewer spray apparatus of claim 1, wherein a distance that the skirt extends outward from the converse surface of the lid is at least half a distance that the dispersal member extends from the converse surface of the lid.

8. The beverage brewer spray apparatus of claim 1, wherein the apertures are configured to direct fluid flowing out of the apertures from within the dispersal member in a radial direction away from the dispersal member.

9. A beverage brewer spray apparatus, comprising:
a lid having an obverse surface, a converse surface, and an open peripheral edge;
a dispersal member fixed to and extending from the converse surface of the lid at an open proximal end of the dispersal member; and
a skirt having a proximal end fixed to and extending outward from the converse surface of the lid;
wherein the dispersal member is a tubular element having a sidewall and a closed distal end, wherein the sidewall has a plurality of apertures formed therethrough, wherein the plurality of apertures are arranged in a distal half of the sidewall;
wherein the lid has a lid through-hole formed between the obverse surface and the converse surface, and the dispersal member is fixed to the converse surface of the lid such that the lid through-hole provides fluid communication from the obverse surface of the lid to the plurality of apertures through an interior of the dispersal member; and
wherein a distance that the skirt extends outward from the converse surface of the lid is at least half a distance that the dispersal member extends from the converse surface of the lid.

10. A beverage brewer and spray apparatus arrangement, comprising;
a beverage brewer; and
the beverage brewer spray apparatus of claim 9;
wherein the beverage brewer includes an injection tube, a brewing chamber configured to receive fluid from the injection tube, and an outflow tube configured to receive fluid from the brewing chamber;
wherein the skirt is configured to guide the dispersal member into an open proximal end of the brewing chamber such that the dispersal member is arranged within an interior of the brewing chamber;
wherein the lid through-hole is configured to receive an end of the injection tube such that the dispersal member receives the fluid from the injection tube and disperses the received fluid through the plurality of apertures against a sidewall of the brewing chamber; and
wherein the outflow tube is configured to receive the dispersed fluid from the brewing chamber.

11. The beverage brewer and spray apparatus arrangement of claim 10, wherein the converse surface of the lid extends beyond the proximal end of the skirt to form a rim configured to support the lid above the brewing chamber, and the skirt is further configured to center the lid on the brewing chamber.

12. The beverage brewer spray apparatus of claim 9, wherein the skirt at least partially encompasses the dispersal member.

13. The beverage brewer spray apparatus of claim 12, wherein the dispersal member extends from the converse surface of the lid a distance that is farther than a distance that the skirt extends from the converse surface of the lid.

14. The beverage brewer spray apparatus of claim 9, wherein the dispersal member is fixed to the converse surface of the lid at a distance from the peripheral edge of the lid such that a peripheral portion of the lid overhangs an outside surface of the skirt, forming a ledge around the skirt.

15. The beverage brewer spray apparatus of claim 9, wherein the apertures are configured to direct fluid flowing out of the apertures from within the dispersal member in a radial direction away from the dispersal member.

16. A beverage brewer and spray apparatus arrangement, comprising;
a beverage brewer; and
a beverage brewer spray apparatus;
wherein the beverage brewer spray apparatus includes:
a lid having an obverse surface, a converse surface, and an open peripheral edge;
a dispersal member fixed to and extending from the converse surface of the lid at an open proximal end of the dispersal member;
a skirt having a proximal end fixed to and extending outward from the converse surface of the lid; and
a container made of fluid-impermeable material;
wherein the dispersal member is a tubular element having a sidewall and a closed distal end, wherein the sidewall has a plurality of apertures formed therethrough, wherein the plurality of apertures are arranged in a distal half of the sidewall;
wherein the lid has a lid through-hole formed between the obverse surface and the converse surface, and the dispersal member is fixed to the converse surface of the lid such that the lid through-hole provides fluid communication from the obverse surface of the lid to the plurality of apertures through an interior of the dispersal member;

wherein the container includes a distal wall and a sidewall fixed at a distal edge to a periphery of the distal wall such that inner surfaces of the distal wall and sidewall define an interior, and an open proximal end defined by a proximal edge of the sidewall;

wherein the skirt and the container are configured to mutually engage such that the open proximal end of the container is removably coupled to the skirt such that the lid seals the open proximal end of the container; and wherein the inner surface of the container sidewall has no openings;

wherein the beverage brewer includes an injection tube, a brewing chamber configured to receive fluid from the injection tube, and an outflow tube configured to receive fluid from the brewing chamber;

wherein the lid through-hole is configured to receive an end of the injection tube such that the dispersal member receives the fluid from the injection tube and disperses the received fluid through the plurality of apertures against the container sidewall; and wherein the outflow tube is configured to pierce the distal wall of the container such that at least an end of the outflow tube is disposed within the interior of the container to receive the dispersed fluid from the container.

17. The beverage brewer and spray apparatus arrangement of claim 16, wherein the container sidewall has a substantially uniform height.

18. The beverage brewer and spray apparatus arrangement of claim 16, wherein an outer surface of the distal wall is flat and defines the outer boundary of the container.

19. The beverage brewer and spray apparatus arrangement of claim 18, wherein the distal wall is made of rubber.

20. The beverage brewer and spray apparatus arrangement of claim 16, wherein an outer surface of the skirt and a surface of the interior of the container are configured for mutual sliding engagement so that the container is removably coupled to the skirt such that the dispersal member is disposed in the interior of the container.

21. The beverage brewer and spray apparatus arrangement of claim 20, wherein the outer surface of the skirt includes scoring to provide a friction fit for mutual sliding engagement.

22. The beverage brewer and spray apparatus arrangement of claim 20, wherein the outer surface of the skirt further includes an annular raised portion and the surface of the interior of the container includes a corresponding annular recessed portion to provide mutual positive engagement.

23. The beverage brewer and spray apparatus arrangement of claim 16, wherein the obverse surface and the converse surface are round, and the peripheral edge is a circumferential edge.

24. The beverage brewer and spray apparatus arrangement of claim 23, wherein the lid through-hole is located in a center of the obverse and converse surfaces.

25. The beverage brewer and spray apparatus arrangement of claim 16, wherein the obverse surface and the converse surface are substantially planar and parallel to each other.

26. The beverage brewer and spray apparatus arrangement of claim 16, wherein the proximal end of the dispersal member is sealed to the converse surface of the lid at the lid through-hole.

27. The beverage brewer and spray apparatus arrangement of claim 16, wherein the dispersal member extends from the converse surface of the lid at a substantially right angle.

28. The beverage brewer and spray apparatus arrangement of claim 16, wherein the dispersal member has a round cross-section.

29. The beverage brewer and spray apparatus arrangement of claim 16, wherein the distal end of the dispersal member is blunt.

30. The beverage brewer and spray apparatus arrangement of claim 16, wherein the skirt at least partially encompasses the dispersal member.

31. The beverage brewer and spray apparatus arrangement of claim 30, wherein the dispersal member extends from the converse surface of the lid a distance that is farther than a distance that the skirt extends from the converse surface of the lid.

32. The beverage brewer and spray apparatus arrangement of claim 16, wherein the skirt extends from the converse surface of the lid at a substantially right angle.

33. The beverage brewer and spray apparatus arrangement of claim 32, wherein a proximal portion of the skirt extends from the converse surface of the lid at a substantially right angle and a distal portion of the skirt tapers inward.

34. The beverage brewer and spray apparatus arrangement of claim 16, wherein the dispersal member is fixed to the converse surface of the lid at a distance from the peripheral edge of the lid such that a peripheral portion of the lid overhangs an outside surface of the skirt, forming a ledge around the skirt.

35. The beverage brewer and spray apparatus arrangement of claim 16, wherein the apertures are configured to direct fluid flowing out of the apertures from within the dispersal member in a radial direction away from the dispersal member.

36. The beverage brewer and spray apparatus arrangement of claim 16, wherein a distance that the skirt extends outward from the converse surface of the lid is at least half a distance that the dispersal member extends from the converse surface of the lid.

* * * * *